(12) United States Patent
Fuchimukai et al.

(10) Patent No.: US 6,741,287 B1
(45) Date of Patent: May 25, 2004

(54) ELECTRONIC STILL CAMERA HAVING SEPARABLE MONITOR DEVICE

(75) Inventors: Atsushi Fuchimukai, Tokyo (JP); Shuzo Seo, Saitama (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 09/520,658

(22) Filed: Mar. 7, 2000

(30) Foreign Application Priority Data

Mar. 10, 1999 (JP) .......................................... 11-063441

(51) Int. Cl.[7] .......................... H04N 5/225; H04N 5/222
(52) U.S. Cl. .................... 348/373; 348/341; 348/333.06
(58) Field of Search ................................ 348/373, 374, 348/375, 376, 341, 333.06; 396/423, 424, 425, 428

(56) References Cited

U.S. PATENT DOCUMENTS

| 4,757,388 A | * | 7/1988 | Someya et al. ........... 348/211.6 |
| 5,043,822 A | * | 8/1991 | Ichiyoshi et al. ............ 348/376 |
| 5,184,173 A | | 2/1993 | Kirigaya |
| 5,294,920 A | | 3/1994 | Itabashi |
| 5,592,224 A | * | 1/1997 | Shim ...................... 348/333.06 |
| 5,739,859 A | * | 4/1998 | Hattori et al. .............. 348/375 |
| 5,801,774 A | * | 9/1998 | Seo ........................ 348/333.06 |
| 5,982,429 A | * | 11/1999 | Kamamoto et al. ..... 348/333.06 |
| 6,115,069 A | * | 9/2000 | Kuroki et al. .............. 348/375 |
| 6,215,524 B1 | * | 4/2001 | Shiozaki ..................... 348/376 |
| 6,549,237 B1 | * | 4/2003 | Inuma et al. .......... 348/333.06 |

FOREIGN PATENT DOCUMENTS

JP        10126654        5/1998

* cited by examiner

*Primary Examiner*—Aung Moe
(74) *Attorney, Agent, or Firm*—Greenblum & Bernstein, P.L.C.

(57) ABSTRACT

An electronic still camera includes a camera body having a photographic optical system, and a monitor device detachably attached to the camera body. The monitor device has an image indication portion in which an object image obtained by the photographic optical system can be indicated. The monitor device can be electrically connected to the camera body when the monitor device is attached to the camera body and is rotatable about a rotation axis provided in the camera body within a predetermined range of angular displacement. The monitor device can be detachably attached to the camera body in any direction within the predetermined angular displacement range.

20 Claims, 10 Drawing Sheets

Fig.8

| Angular Displacement | Detection of Angle SW | Detection of Front/Rear Position SW | Image | Current |
|---|---|---|---|---|
| A | ON | OFF | Erect | + |
| B | OFF | OFF | Inverted | + |
| C | OFF | ON | OFF | − |
| D | ON | ON | Inverted | − |

ELECTRONIC STILL CAMERA HAVING SEPARABLE MONITOR DEVICE

BACKGROUND OF THE INVENTION

1. Field of the Invention

The present invention relates to an electronic still camera to which, for example, a monitor device can be detachably attached.

2. Description of the Related Art

In recent years, it has been proposed to provide a rotation connection device, such as a hinge, on a monitor device which can be detachably attached to an electronic still camera, so that when the monitor device is attached to a camera body, the monitor can be rotated via the hinge, relative to the camera body. The camera body and the monitor are electrically interconnected by means of a number of contact pins or cables, provided thereon at positions different from the rotation connection device (hinge).

However, upon attaching the rotatable monitor to the camera body, it is necessary to position or register and connect the contact pins while holding the monitor, and hence the attachment and detachment operations of the monitor to and from the camera body are troublesome and time-consuming. Moreover, the contact pins provided at positions different from the rotation connection device increase the number of components, and thus incurs an increase in manufacturing cost, and the size of the camera body and the monitor.

SUMMARY OF THE INVENTION

It is an object of the present invention to provide an inexpensive and small electronic still camera to which a monitor can be detachably attached, wherein the attachment and detachment of the monitor can be easily carried out and the number of components can be reduced.

To achieve the object mentioned above, according to the present invention, an electronic still camera is provided which includes a camera body having a photographic optical system, and a monitor device detachably attached to the camera body, the monitor device including an image indication portion in which an object image obtained by the photographic optical system can be indicated. The monitor device is rotatable about a rotation axis provided in the camera body within a predetermined range of angular displacement, and can be detachably attached to the camera body in any direction within the predetermined angular displacement range.

Preferably, the rotation axis extends in a plane perpendicular to an optical axis of the photographic optical system.

Preferably, the camera body is in the form of a substantially parallelepiped body, the photographic optical system being provided so that the optical axis thereof extends in a direction perpendicular to a first side surface of the camera body; the camera body being provided with a substantially parallelepiped recess which is open at a second side surface of the camera body opposite to the first side surface and is open at a third side surface of the camera body perpendicular to the first and second side surfaces. The monitor device is substantially identical in shape and size to the parallelepiped recess, so that the monitor device can be received into the parallelepiped recess.

Preferably, first and second body engagement portions provided in the camera body, and first and second monitor engagement portions provided in the monitor device are also provided, which can be rotatably engaged by the first and second body engagement portions. The first and second body engagement portions are identical in shape and size, are formed on the first and second side surfaces of the parallelepiped recess, are opposed to each other, and lie on a rotational axis which is perpendicular to the optical axis. The first and second monitor engagement portions are identical in shape and size and are formed on first and second side surfaces of the monitor device which are opposed to the first and second side surfaces of the parallelepiped recess when the monitor device is received into the parallelepiped recess of the camera body.

Preferably, the first and second body engagement portions are each in the form of a hemispherical recess, the first and second monitor engagement portions are each in the form of a hemispherical projection, and the first and second monitor engagement portions are moveable in a direction along the rotation axis thereof relative to the corresponding first and second monitor side surfaces.

Preferably, the monitor device includes a first resilient member which biases the first monitor engagement portion toward the first monitor side surface, and a second resilient member which biases the second monitor engagement portion toward the second monitor side surface; whereby the first and second monitor engagement portions can be securely engaged by the first and second body engagement portions by the biasing force of the first and second resilient members.

Preferably, the monitor device includes a power switch which is actuated to turn ON or OFF a power source of the monitor device, and a slip-off prevention device for preventing the monitor device attached to the camera body from being accidentally disengaged therefrom when the power source is turned ON.

Preferably, the slip-off prevention device includes first and second shaft members which are moved along the rotation axis in association with the movement of the power switch between an ON position and an OFF position, and a rotary plate which connects the first and second shaft members. The first and second shaft members are moved to restrict the movement of the first and second monitor engagement portions when the power switch is moved to the ON position.

Preferably, an image pickup device is also provided which converts an object image obtained through the photographic optical system into an electrical signal; wherein the monitor device indicates the object image converted by the image pickup device on the indication portion.

Preferably, an image memory is also provided which stores the electrical signal produced by the image pickup device, wherein the monitor device indicates the object image, which is stored in the image memory, on the indication portion.

Preferably, an electric signal including at least one signal corresponding to the object image is transmitted and received between the camera body and the monitor device.

Preferably, the monitor device can be detachably attached to the camera body, wherein the image indication portion can face either forward or backward with respect to the camera body.

Preferably, there is also provided a front/rear position detection device for detecting whether the image indication portion is attached in a front position or in a rear position, with respect to the camera body; an angle detection device for detecting the angle of the image indication portion about a rotation axis relative to the optical axis of the photographic optical system; and a control device for controlling the direction of the object image indicated in the image indication portion, in accordance with the detection results of the front/rear position detection device and the angle detection device.

Preferably, the camera body includes a body power supply; the camera body including the first and second body engagement portions, and the monitor device including the first and second monitor engagement portions; wherein when the monitor device is attached to the camera body, the power supply of the camera body supplies power to the monitor device.

Preferably, the control device controls the direction of electric current which flows in the monitor device in accordance with the detection results of the front/rear position detection device and the angle detection device.

Preferably, the monitor device includes a monitor power supply, so that when the monitor device is detached from the camera body, the monitor device is operated by power supplied from the monitor power supply.

Preferably, the front/rear position detection device includes an outer peripheral groove provided in the vicinity of one of the first and second monitor engagement portions of the monitor device, and a front/rear position detection switch provided on the camera body and having a front/rear position detection pin which projects into the parallelepiped recess so that the front/rear position detection switch is turned ON or OFF in accordance with the projection length of the front/rear position detection pin; whereby the front position and rear position of the image indication portion is detected in accordance with whether or not the front/rear position detection pin is received into the outer peripheral groove.

Preferably, the angle detection device includes first and second annular grooves provided around the first and second body engagement portions; first and second annular projections which are provided around the first and second monitor engagement portions and which are respectively engageable with the first and second annular grooves; and an angle detection switch, provided in the camera body, including an angle detection pin which projects into only one of the first and second annular grooves, so that the angular position of the image indication portion can be detected in accordance with the depression of the angle detection pin of the angle detection switch by one of the first annular projection and the second annular projection.

The present disclosure relates to subject matter contained in Japanese Patent Application No. 11-63441 (filed on Mar. 10, 1999) which is expressly incorporated herein by reference in its entirety.

BRIEF DESCRIPTION OF THE DRAWINGS

The invention will be discussed below in detail with reference to the accompanying drawings, in which:

FIG. 8 is a table showing a relationship among a range of an angular displacements A through D shown in FIGS. 2 and 3, detection results of an angle detection switch and a front/rear position detection switch, the direction of an image indicated in an image indication portion, and the electric current direction;

FIG. 10 is a cross sectional view of a monitor shown in FIG. 1, taken along a plane including a center axis R thereof, when a power switch is ON;

DESCRIPTION OF THE PREFERRED EMBODIMENT

Figure 1:
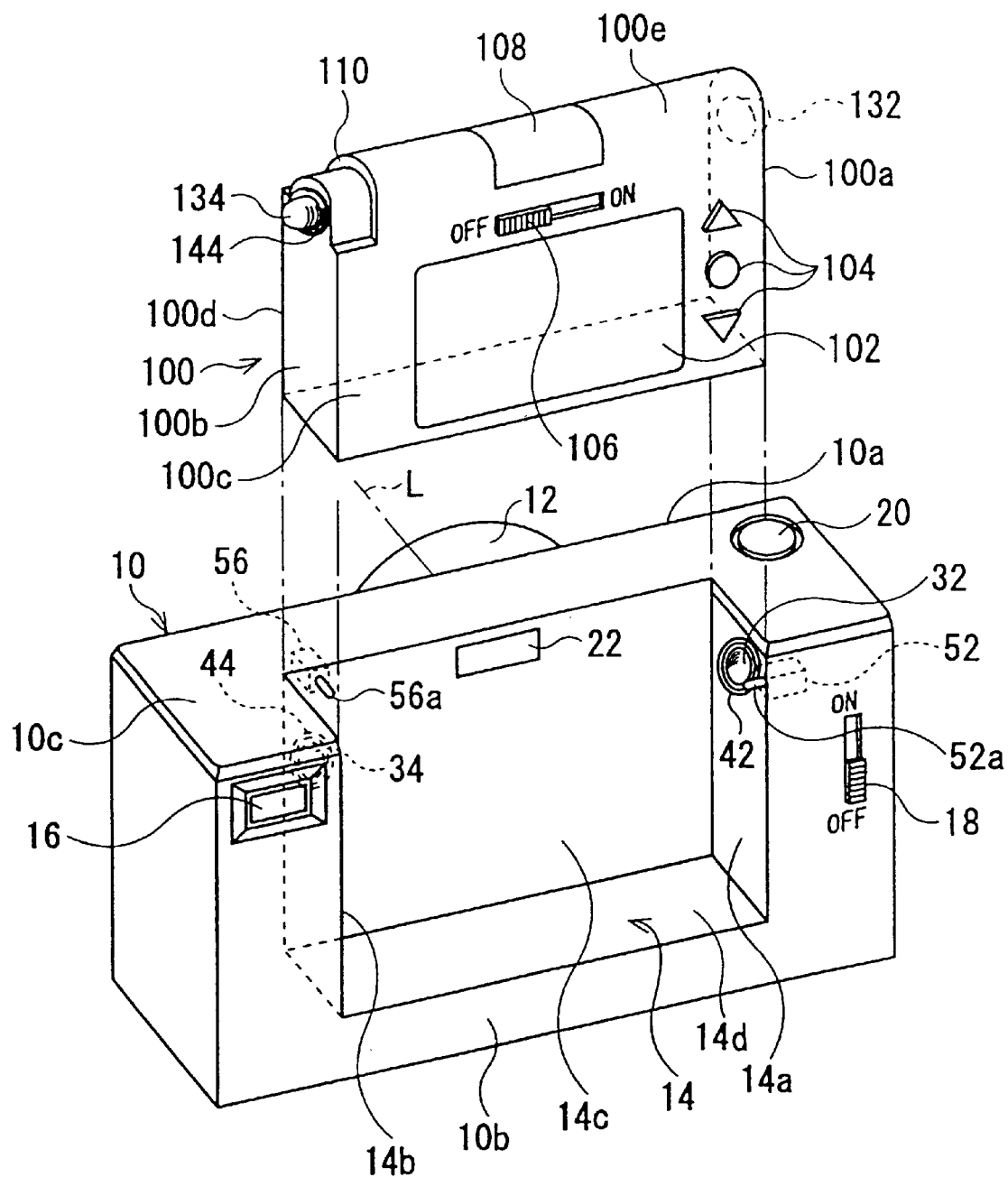
FIG. 1 is a perspective view of an electronic still camera according to the present invention.

FIG. 1 shows an embodiment of an electronic still camera according to the present invention. The electronic still camera is composed of a camera body 10 and a monitor device 100. The monitor 100 is detachably attached to the camera body 10. When the monitor 100 is attached to the camera body, the monitor is rotatable relative to the camera body 10. The camera body 10 is provided with a lens unit 12 having a photographic optical system. An object image formed by the lens unit 12 can be viewed through a view finder 16 of the camera body or by an image indication portion 102 of the monitor device 100.

Namely, the lens unit 12 is provided on the front surface (first side surface) 10a of the camera body 10 and the optical axis L of the photographic optical system is normal to the front surface 10a. The rear surface 10b (second side surface) of the camera body 10 opposite to the front surface 10a is provided thereon with a recess (rectangular parallelepiped recess) 14. The recess 14 is open at the rear surface 10b, and an upper surface (third side surface) 10c which is perpendicular to the rear surface 10b or the front surface 10a. The rear surface 10b is provided thereon with a view finder 16 and a main switch 18 on the left and right sides of the recess 14 in FIG. 1, respectively. A release button 20 is provided on the right portion of the upper surface 10c of the camera body.

In general, upon photographing, an object image is indicated in the image indication portion 102 of the monitor 100 and can be also viewed through the view finder 16. Therefore, the object image can be viewed through the finder 16 even when no monitor 100 is connected or no object image is indicated in the image indication portion 102.

The recess 14 is provided with first, second, third and fourth recess surfaces 14a, 14b, 14c, and 14d, respectively. The first and second recess side surfaces 14a and 14b are opposed to each other and are defined by planes parallel to the optical axis L. The third recess surface 14c is defined by a plane perpendicular to the first and second recess side surfaces 14a and 14b and to the optical axis L. The fourth recess surface 14d is defined by a plane parallel to the optical axis L and perpendicular to the other recess surfaces 14a, 14b and 14c.

The first and second recess side surfaces 14a and 14b are provided, on their upper portions adjacent to the upper surface 10c of the camera body, with first and second body engagement portions 32 and 34. The first and second body engagement portions 32 and 34 are each in the form of a hemispherical recess and are identical in size and shape. There is an annular groove 42 concentrically surrounding the first body engagement portion 32. Likewise, an annular groove 44 is provided to concentrically surround the second body engagement portion 34. An angle detection switch 52 is provided in the camera body and in the vicinity of the annular groove 42. The angle detection switch 52 is provided with a pin (angle detection pin) 52a which projects from the camera body 10 into the annular groove 42.

A front/rear position detection switch 56 is provided in the camera body 10 and in the vicinity of the left and upper corner of the third recess surface 14c in FIG. 1. The front/rear position detection switch 56 is provided with a pin (front/rear position detection pin) 56a which projects from the third recess surface 14c into the recess 14. There is a communication window 22 on the third recess surface 14c of the recess 14 at the central upper portion thereof, so that transmission and receipt of electrical signals can be carried out between the camera body 10 and the monitor device 100 through the communication window 22, for example, in a radio communication system.

The shape and size of the monitor device 100 are substantially identical to the recess 14. The monitor device 100 can be received in the recess 14, so that one of the front and rear surfaces 100c and 100d is opposed to the third recess surface 14c. The monitor device 100 is provided with first and second side surfaces 100a and 10b, parallel with each other, which are provided with first and second monitor engagement portions 132 and 134, respectively. When the monitor 100 is received into the camera body 10, the first and second monitor side surfaces 100a and 100b are opposed to the recess side surfaces 14a and 14b, respectively, and the first and second monitor engagement portions 132 and 134 are securely engaged with the first and second body engagement portions 32 and 34, respectively.

The first and second monitor engagement portions 132 and 134 are identical and are in the form of a hemispherical projection whose diameter is substantially equal to that of the body engagement portions 32 and 34. The length of projection of the first and second monitor engagement portions 132 and 134 from the first and second monitor side surfaces 10a and 100b is variable. The first and second monitor engagement portions 132 and 134 are rotatably engaged in the first and second body engagement portions 32 and 34, respectively, when the monitor 100 is attached to the camera body 10. Consequently, the monitor device 100 is electrically connected to the camera body 100 through the first and second monitor engagement portions 132 and 134 and the first and second body engagement portions 32 and 34, so that the electric power can be supplied from the battery within the camera body 10.

Figure 6:
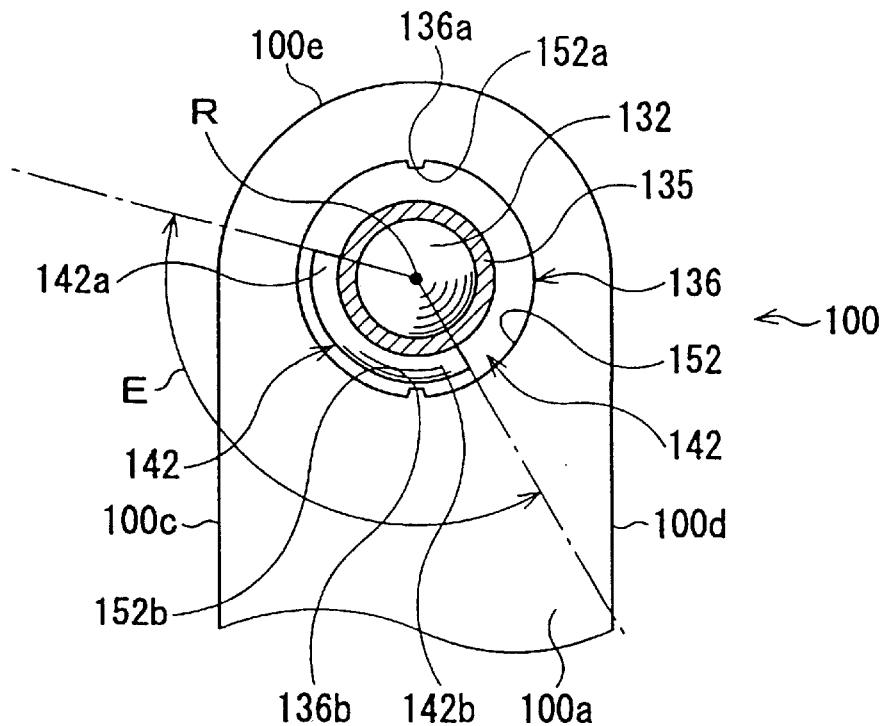
FIG. 6 is an enlarged view of a first monitor side surface of a monitor shown in FIG. 1.

A projection 144 is provided around the second monitor engagement portion 134. Likewise, a projection 142 (not shown in FIG. 1) is provided around the first monitor engagement portion 132, as can be seen in FIG. 6.

The front and rear surfaces 100c and 100d of the monitor device 100 are parallel with each other and perpendicular to the first and second monitor side surfaces 100a and 100b, and are interconnected via a curved surface 100e at the upper end of the monitor device 100 in FIG. 1.

Figure 11:
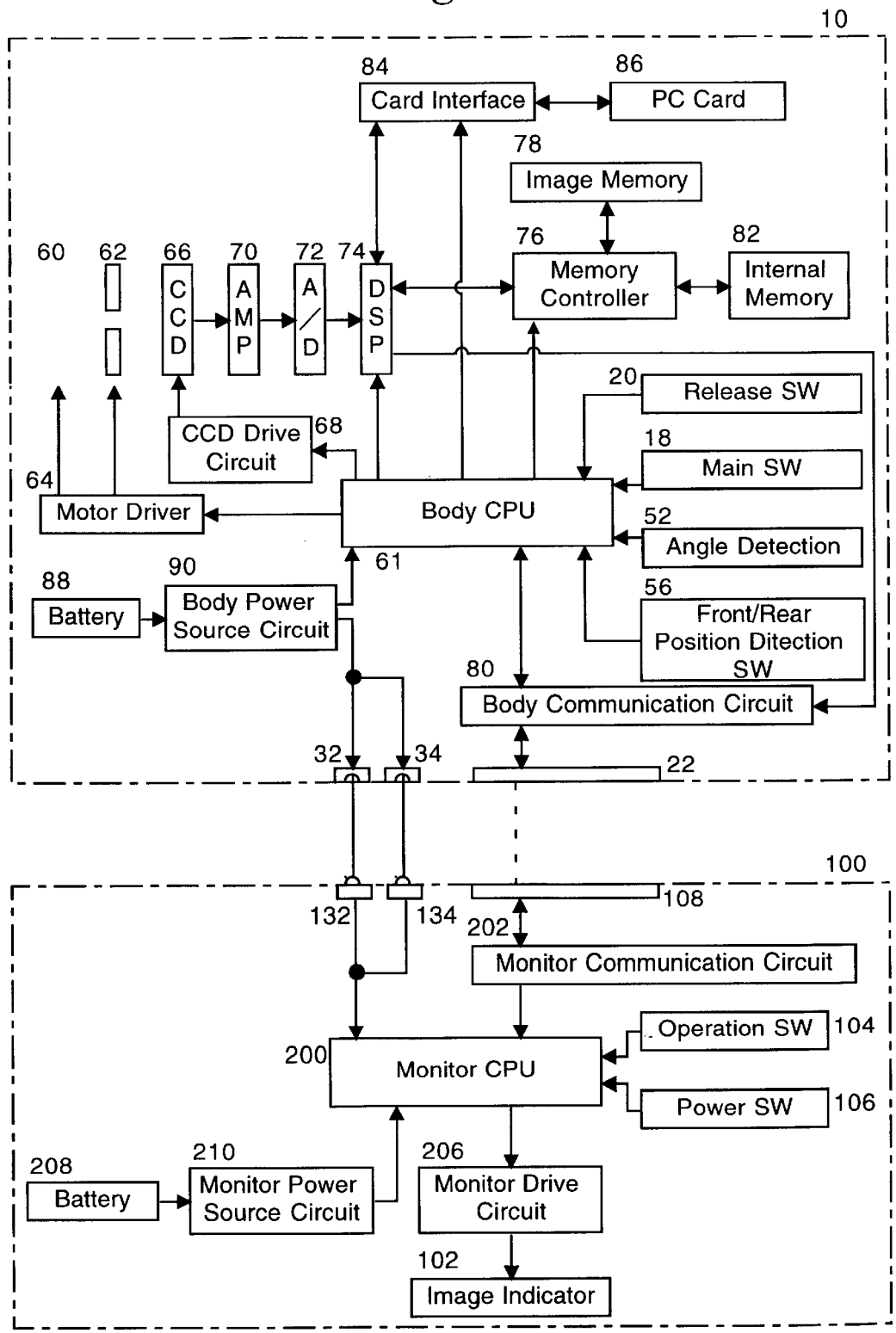
FIG. 11 is a block diagram of an internal structure of an electrical still camera shown in FIG. 1 to show the electronic structure.

The front surface 100c is provided thereon with an image indication portion 102 which is made of, for example, an LCD. An object image produced by a CCD (image pickup device) 66 (see. FIG. 11) through the lens unit 12 or a reproduced image from an image memory 78 is indicated in the image indication portion 102. The reproduced image refers to an image which is obtained by reading image signals recorded, for example, in an internal memory 82 or a recording medium, etc., of the camera body 10.

There are a plurality of operation switches 104 provided on the right side of the image indication portion 102 in FIG. 1. When the monitor 100 is attached to the camera body 10, the selection of functions and other setting operations are carried out by the manual operation of the operation switches 104. Even if the monitor 100 is detached from the camera body, it is possible to carry out the selection of functions, various setting operations, and instructions of the photographing operation, using the monitor device 100. Thus, the monitor device 100 functions also as a remote controller.

There is a power switch 106 above the image indication portion 102, so that the power supply to the monitor device 100 is controlled (switched) in accordance with the manual operation of the power switch 106. The monitor 100 is provided with a communication window 108 at the center of the curved surface 10e, so that the transmission and reception of electrical signals, for example, image signals or command signals from the operation switch 104 can be carried out between the communication window 108 of the monitor 100 and the communication window 22 of the camera body 10.

A front/rear position detection device which includes an outer peripheral groove 110 and the front/rear position detection switch 56 will be discussed below with reference to FIGS. 2 and 3. The outer peripheral groove 110 is formed along the outer periphery of the curved surface 100e at the end of the curved surface 10e adjacent to the second monitor side surface 100b.

Figure 2:
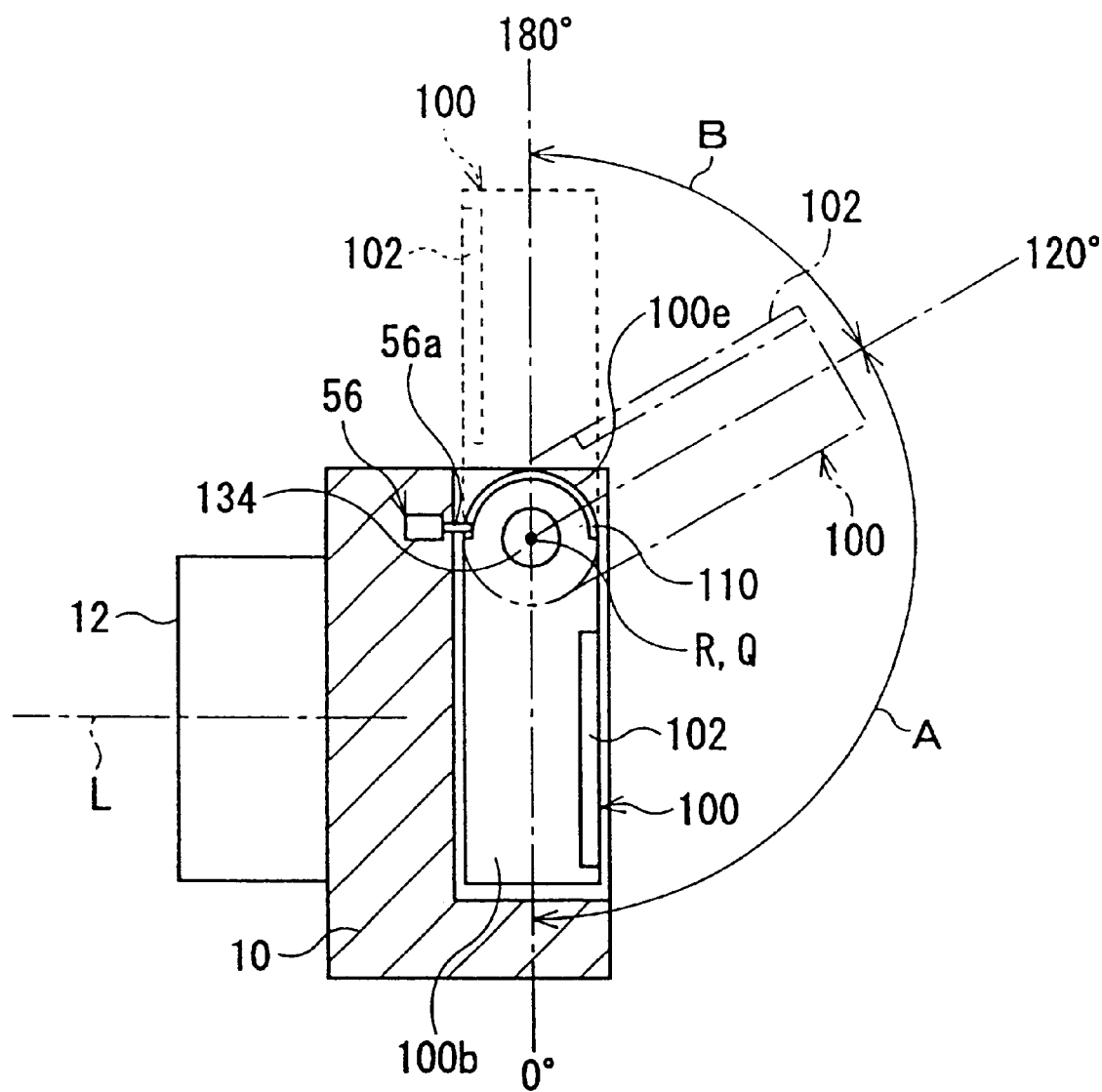
FIG. 2 is a schematic sectional view of a monitor attached to a camera body, with its image indication portion facing forward, in an electronic still camera shown in FIG. 1.
Figure 3:
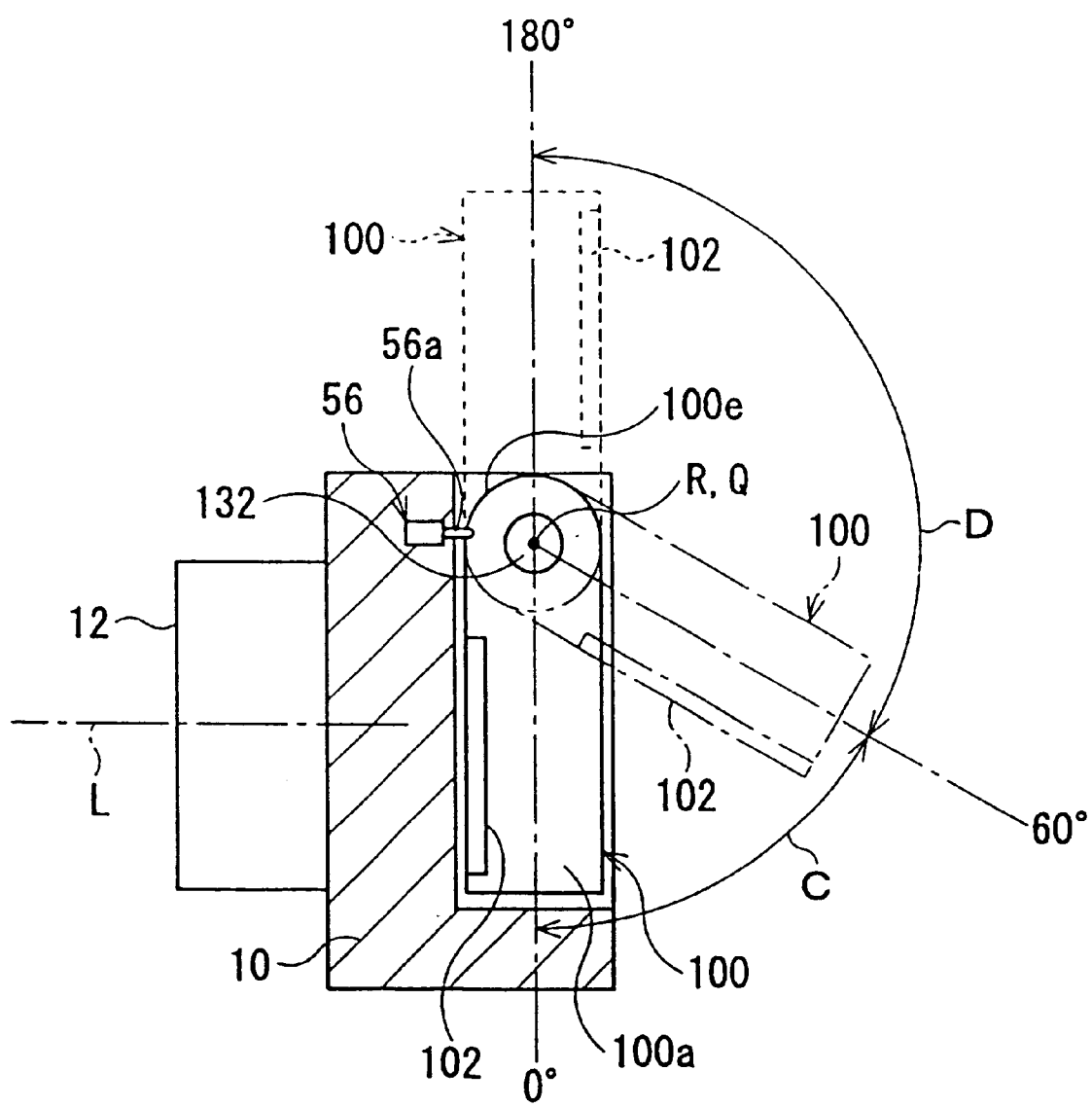
FIG. 3 is a schematic sectional view of a monitor attached to a camera body, with its image indication portion facing backward, in an electronic still camera shown in FIG. 1.

FIGS. 2 and 3 are sectional views taken along a plane including the front/rear position detection switch 56. The monitor device 100 is detachably attached to the camera body 10, with either the front surface or the rear surface facing forward. In FIG. 2, the monitor 100 is attached to the camera body, so that the image indication portion 102 is located on the opposite side to (i.e., away from) the lens unit 12. In FIG. 2, the image indication portion 102 is located in a front position, i.e., oriented forward with respect to the camera body 10. In FIG. 3, the monitor 100 is attached to the camera body 1, so that the image indication portion 102 is located on the same side as the lens unit 12, i.e., close to the lens unit. In FIG. 3, the image indication portion 102 is located in a rear position, i.e., oriented rearward with respect to the camera body.

As mentioned above, the first and second body engagement portions 32 and 34 are identical in size and shape. Likewise, the first and second monitor engagement portions 132 and 134 are identical in size and shape. Consequently, when the monitor 100 is attached to the camera body 10, with the image indication portion 102 being located in the front position, the first body engagement portion 32 engages with the first monitor engagement portion 132 and the second body engagement portion 34 engages with the second monitor engagement portion 134, respectively. Likewise, when the image indication portion 102 is located in the rear position, the first body engagement portion 32 engages with the second monitor engagement portion 134 and the second body engagement portion 34 engages with the first monitor engagement portion 132, respectively.

The first and second body engagement portions 32 and 34 and the first and second monitor engagement portions 132 and 134 are made of a conductor, such as a metal, and function as electrical contacts. In other words, when the first and second body engagement portions 32 and 34 engage with the first and second monitor engagement portions 132 and 134, respectively, the camera body 10 and the monitor device 100 are electrically interconnected.

As shown in FIGS. 2 and 3, the monitor device 100 is rotatable in both the clockwise direction and the counterclockwise direction about an axis R passing via the centers of the first and second monitor engagement portions 132 and 134. Namely, the image indication portion 102 can be set in an optional angular position with respect to the optical axis L. The axis R is identical to an axis Q which connects the centers of the first and second body engagement portions 32 and 34 and lies in a plane perpendicular to the optical axis L. The upper portion of the monitor 100 is defined by the curved surface 10e whose center of curvature is located on the axis R, so that the monitor 100 can be smoothly rotated without interfering with the camera body 10.

The monitor 100 is rotatable between an accommodation position indicated by a solid line and a fully open position indicated by a phantom line. The angular displacement is indicated by arrows "A" and "B" in FIG. 2 and by arrows "C" and "D" in FIG. 3, respectively. When the monitor device 100 is in the accommodation position, the angle between the monitor device 100 and the camera body 10 is substantially zero. When the monitor device 100 is in the fully open position, the angle is substantially 180°.

The monitor device 100 can be attached to the camera body in any direction within the angular displacement from approximately 0° to 180°, as the first and second monitor engagement portions 132 and 134 are hemispherical and the hemispherical surfaces are spaced from the axis of rotation R at an equi-distance. The first and second monitor engagement portions 132 and 134 are biased along the axis R by compression springs (resilient members) 156 and 166, respectively (see FIG. 9) in a direction to move away from one another, so that the first and second monitor engagement portions 132 and 134 can be relatively moved upon attachment or detachment of the monitor to and from the camera body. Note that the first and second monitor engagement portions 132 and 134 are not limited to a hemispherical shape and can be, for example, cylindrical.

When the monitor device 100 is attached to the camera body 10 with the image indication portion 102 located in the front position (FIG. 2), the pin 56a of the front/rear position detection switch 56 is received in the outer peripheral groove 110, so that the front/rear position detection switch 56 is OFF. When the monitor device 100 is moved in the angular displacement range "A" or "B", the pin 56a is received in the groove 110. When the monitor device 100 is attached to the camera body 10 with the image indication portion 102 located in the rear position (FIG. 3), the pin 56a of the front/rear position detection switch 56 is continuously depressed by the curved surface 100e, in the angular displacement range "C" or "D", so that the front/rear position detection switch 56 is turned ON.

As can be understood from the foregoing, the ON/OFF position of the front/rear position detection switch 56 is determined in accordance with the location of the peripheral groove 110 on the first recess side surface 14a side of the recess 14 or on the second recess side surface 14b side thereof. The camera body 10 judges that the monitor 100 is attached thereto in the front position or the rear position, based on the detection result of the front/rear position detection switch 56 and changes the direction of the current to be supplied to the monitor device 100. Thus, a correct electrical connection can be always established between the monitor device 100 and the camera body 10, regardless of the attachment direction of the monitor device.

Note that although the outer peripheral groove 110 extends in an arc over 180 degrees about the axis R in the illustrated embodiment, the shape of the groove 110 is not limited thereto. Namely, the groove 110 can be of any shape so long as the pin 56a is received therein, regardless of the angular position of the image indicating portion 102.

An operator who holds the camera body by one hand can rotate the monitor device 100 to an appropriate position by the other hand to thereby view and take a picture of an object. For instance, as shown in FIG. 2, when the monitor 100 is attached to the camera body 10 with the image indicating portion 102 located in the front position, the object image can be viewed in the image indicating portion 102 on the side opposite the object to be taken, with respect to the lens unit 12, within the angular displacement "A", as in a conventional camera having a built-in monitor. In the angular displacement "B", the object image can be viewed on the same side as the object with respect to the lens unit 12.

When the monitor device 100 is attached to the camera body 10, with the image indication portion 102 located in the rear position, as shown in FIG. 3, the image indication portion 102 is protected by the camera body 10 within the angular displacement range "C". In the angular displacement range "D", even if the camera body 10 is held above the operator's head, the object image can be viewed through the image indicating portion 102. Also, in the angular displacement range "D", if the lens unit 12 is directed downward, the operator can easily view the object image in the image indicating portion 102 without looking downward.

However, if the vertical and horizontal directions of the object image in the image indicating portion 102 are fixed, i.e., for example, if the direction is determined such that the portion of the object image on the axis R side defines an upward portion (the image in this position is referred to as an erect image) in the angular displacement range "A", and the object image to be viewed by an operator is turned by 180 degrees (i.e., is inverted) in the angular displacement range "B" or "D" so that the object image is upside down.

To solve this problem, in the illustrated embodiment, the angle detection switch 52 is provided to detect the angular position of the monitor device 100. Consequently, the angular position of the image indicating portion 102 is judged in accordance with the detection results of the front/rear position detection switch 56 and the angle detection switch 52. In the angular displacement range "B" or "D", the object image in the image indicating portion 102 is inverted in both the horizontal direction and the vertical direction. Note that in the angular displacement range "C", it is judged that the image indicating portion 102 is not used by the operator, and hence the image indication portion 102 is turned OFF.

Referring to FIGS. 4 through 7, an angle detection device comprised of the annular grooves 42, 44, the projections 142, 144, and the angle detection switch 52 will be discussed below.

Figure 4:
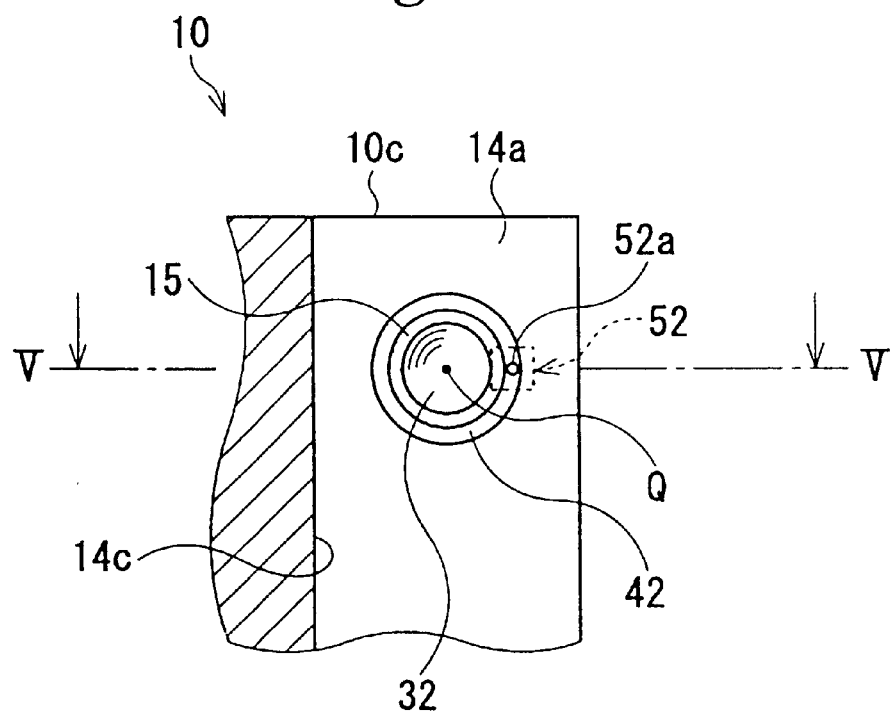
FIG. 4 is an enlarged view of a part of a first recess side surface of a camera body shown in FIG. 1.
Figure 5:
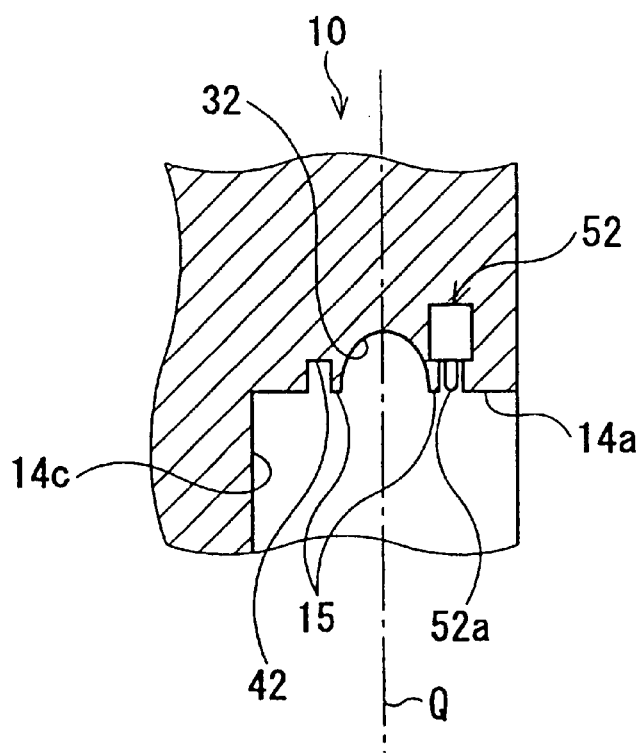
FIG. 5 is a cross sectional view taken along the line V—V in FIG. 4 to show the vicinity of a first recess side surface of a camera body.
Figure 7:
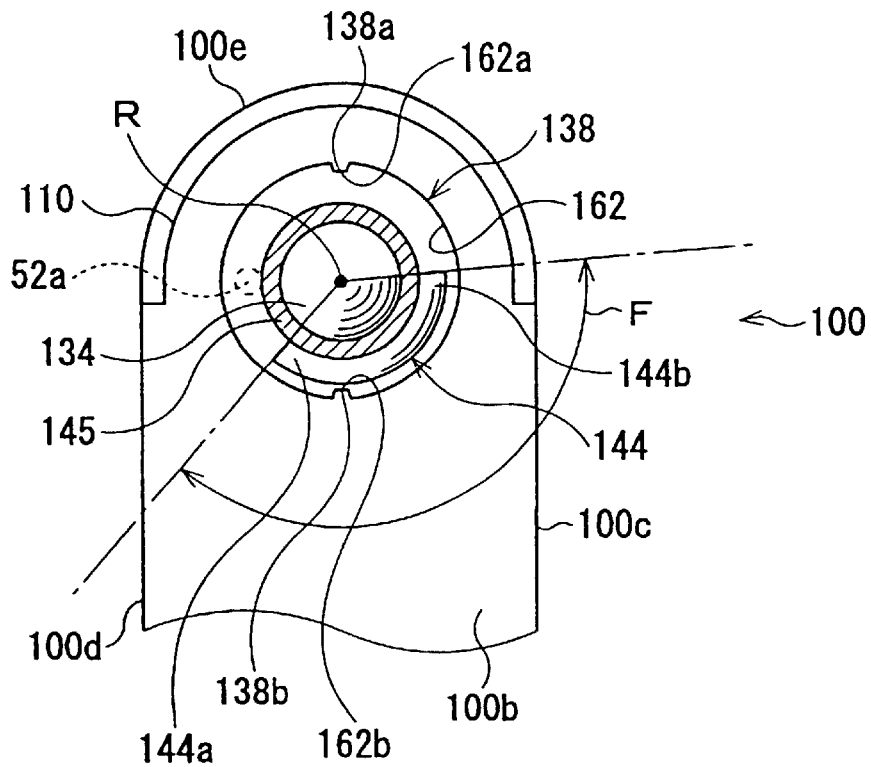
FIG. 7 is an enlarged view of a second monitor side surface of a monitor shown in FIG. 1.

FIG. 4 shows an enlarged sectional side view taken along a plane including the recess side surface 14a to show the first body engagement portion 32 and the surroundings thereof. FIG. 5 is a sectional view taken along the line V—V in FIG. 4. FIG. 6 is an enlarged side view of the first monitor engagement portion 132 of the first monitor side surface 100a and the surroundings thereof. FIG. 7 is an enlarged side view of the second monitor engagement portion 134 of the second monitor side surface 100b and the surroundings thereof.

As can be seen in FIGS. 4 and 5, the pin 52a of the angle detection switch 52 is located in a substantially horizontal plane which includes the axis Q. The pin 52a projects from the camera body 10 into the annular groove 42, with the front end being retracted from the first recess side surface 14a. Note that the hatched annular area between the first body engagement portion 32 and the annular groove 42 defines a frictional surface 15 which is brought into sliding contact with the monitor device 100 when the monitor device 100 is attached.

As shown in FIG. 6, the first monitor side surface 100a is provided with a circular opening 152 through which the first monitor engagement portion 132 and the shaft portion 136 project outward and are moved together along the axis R. The shaft portion 136 has a diameter substantially equal to the diameter of the opening 152 and is provided with an annular projection 142 whose center is located on the axis R of the first monitor engagement portion 132. As shown in FIG. 6, the projection 142 extends in the range of angle E.

There are two cut-away portions 136a and 136b on the outer periphery of the shaft portion 136. There are two engagement portions 152a and 152b which can be engaged in the cut-away portions 136a and 136b in the opening 152 of the monitor device 100, respectively. The engagement between the cut-away portions 136a, 136b and the engagement portions 152a, 152b permits the shaft portion 136 to move in the axial direction along the axis R but prevents relative rotation of the shaft portion 136 about the axis R with respect to the monitor device. Consequently, the projection 142 is always located in a predetermined angular position about the axis R.

When the image indication portion 102 is in the front position and the monitor device 100 is located at a first angle position indicated by a solid line in FIG. 2, the pin 52a of the angle detection switch 52 engages with and is pressed by the end 142a of the projection 142. Consequently, the angle detection switch 52 is turned ON. Since the front/rear position detection switch 56 is OFF and the angle detection switch 52 is ON, an erect object image is indicated in the image indication portion 102.

In accordance with the rotation of the monitor device 100 from the first angle position in the counterclockwise direction in FIG. 2, the portion of the projection 142 that engages with the pin 52a is moved from the end 142a toward the end 142b in the counterclockwise direction (clockwise with respect to FIG. 6). When the monitor device 100 is in a second angle position (120 degrees), the end 142b engages with the pin 52a. Thus, when the rotation of the monitor device 100 from the first angle position toward the second angle position takes place within the angular displacement range A (between the first angle position and the second angle position), the pin 52a is depressed by the projection 142 and hence an erect object image is indicated in the image indication portion 102.

When further rotation of the monitor device 100 from the second angle position in the counterclockwise direction occurs, the pin 52a is disengaged from the projection 142, so that the angle detection switch 52 is turned OFF. When the monitor device 100 is rotated from the second angle position toward the third angle position (180 degrees) in the angular displacement range B (between the second angle position and the third angle position), no depression of the pin 52a takes place. Consequently, both the angle detection switch 52 and the front/rear position detection switch 56 are OFF, so that an inverted object image which is inverted in the horizontal and vertical directions is indicated in the image indication portion 102.

The shaft portion 136 is provided with an annular frictional surface 135 which is located on the outer periphery of the first monitor engagement portion 132 and is shown hatched in FIG. 6. The shaft portion 136 is continuously biased by the spring 156, so that the frictional surface 135 is in sliding contact with the frictional surface 15 of the camera body 10. When the rotation of the monitor device 100 occurs while the first body engagement portion 32 engages with the first monitor engagement portion 132, the frictional surface 135 is brought into sliding contact with the frictional surface 15. However, if the rotation of the monitor device 100 is stopped, the monitor device 100 is positioned in an optional angle position due to the friction resistance (maximum static friction is h) produced between the frictional surfaces 135 and 15.

As shown in FIG. 7, the second monitor side surface 100b is provided thereon with a shaft portion 138 integral with the second monitor engagement portion 134, and an annular projection 144 formed on the shaft portion 138. The projection 144 extends in the range of angular displacement F. To prevent the rotation of the shaft portion 138, the shaft portion 138 is provided on its outer periphery with cut-away portions 138a and 138b, and the opening 162 of the second monitor side surface 100b is provided with engagement portions 162a and 162b which engage with the cut-away portions 138a and 138b, respectively.

When the image indication portion 102 is in the rear position and the monitor device 100 is in the fourth angle position (0 degrees) indicated by a solid line in FIG. 3, the pin 52a of the angle detection switch 52 which is located in a position indicated by a phantom line in FIG. 7 is not depressed. Consequently, the angle detection switch 52 is OFF. Since the angle detection switch 52 is OFF and the front/rear position detection switch 56 is ON, no image is indicated in the image indication portion 12.

In accordance with the rotation of the monitor device 100 from the fourth angle position in the counterclockwise direction in FIG. 3, the portion of the shaft portion 138 that is opposed to the pin 52a is moved in the counterclockwise direction. When the monitor device 100 is in the angle position (60 degrees) shown in FIG. 3, the pin 52a is engaged and depressed by the end 144a of the projection 144. Consequently, the angle detection switch 52 is turned ON. When the monitor device 100 is rotated from the fourth angle position toward the fifth angle position within the angular displacement range C (between the fourth angle position and the fifth angle position), the pin 52a is not depressed by the projection 144, so that no image is indicated in the image indication portion 102.

When further rotation of the monitor device 100 from the fifth angle position in the counterclockwise direction occurs, the engagement between the projection 144 and the pin 52a is moved from the end 144a toward the end 144b. During this rotation, the pin 52a is kept depressed, so that the angle detection switch 52 is maintained ON. Thus, during the rotation of the monitor device 100 from the fifth angle position toward the sixth angle position (180 degrees) within the angular displacement range D (between the fifth angle position and the sixth angle position), the pin 52 is depressed. Consequently, since both the angle detection switch 52 and the front/rear position detection switch 56 are ON, an inverted object image is indicated in the image indication portion 102.

As can be understood from the foregoing, in an electronic still camera according to the illustrated embodiment, since the inversion of the object image is automatically carried out in accordance with the front/rear direction and the angular position of the image indication portion 102 provided in the monitor device 100, it is not necessary for the operator to tilt his or her head to one side in accordance with the angular position of the image indication portion 102 to confirm the object image.

FIG. 8 is a table which shows a relationship among the angular displacement range of the monitor device 100, the detection results of the angle detection switch 52 and the front/rear position detection switch 56, the direction of the object image indicated in the image indication portion 102, and the direction of the current. As can be seen from this table, the angle detection switch 52 and the front/rear position detection switch 56 can prevent a failure of electrical connection due to an error in the mounting direction of the monitor device 100 and can enhance the visibility of the object image, regardless of the angular position of the image indication portion 102.

Figure 9:
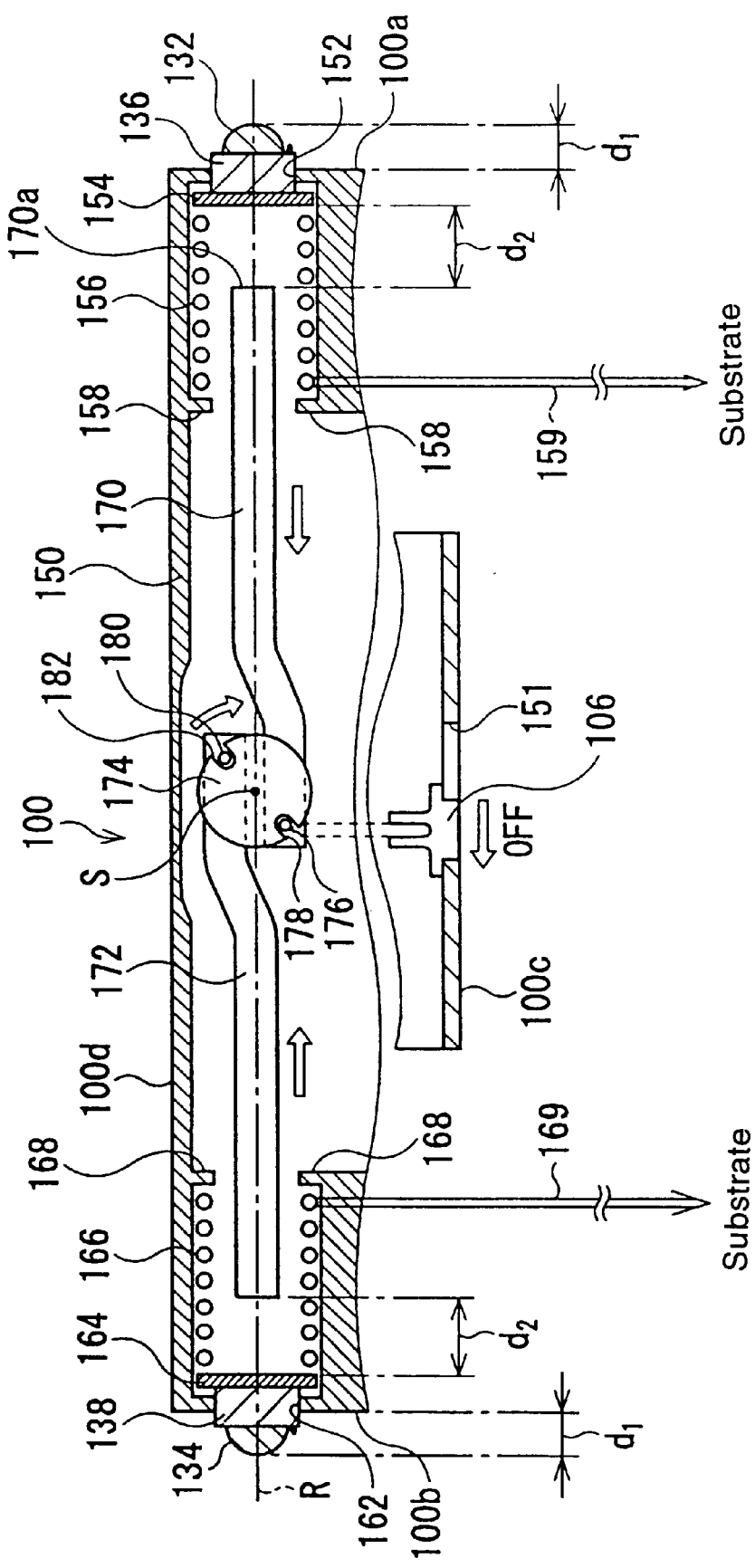
FIG. 9 is a cross sectional view of a monitor shown in FIG. 1, taken along a plane including a center axis R thereof, when a power switch is OFF.
Figure 10:
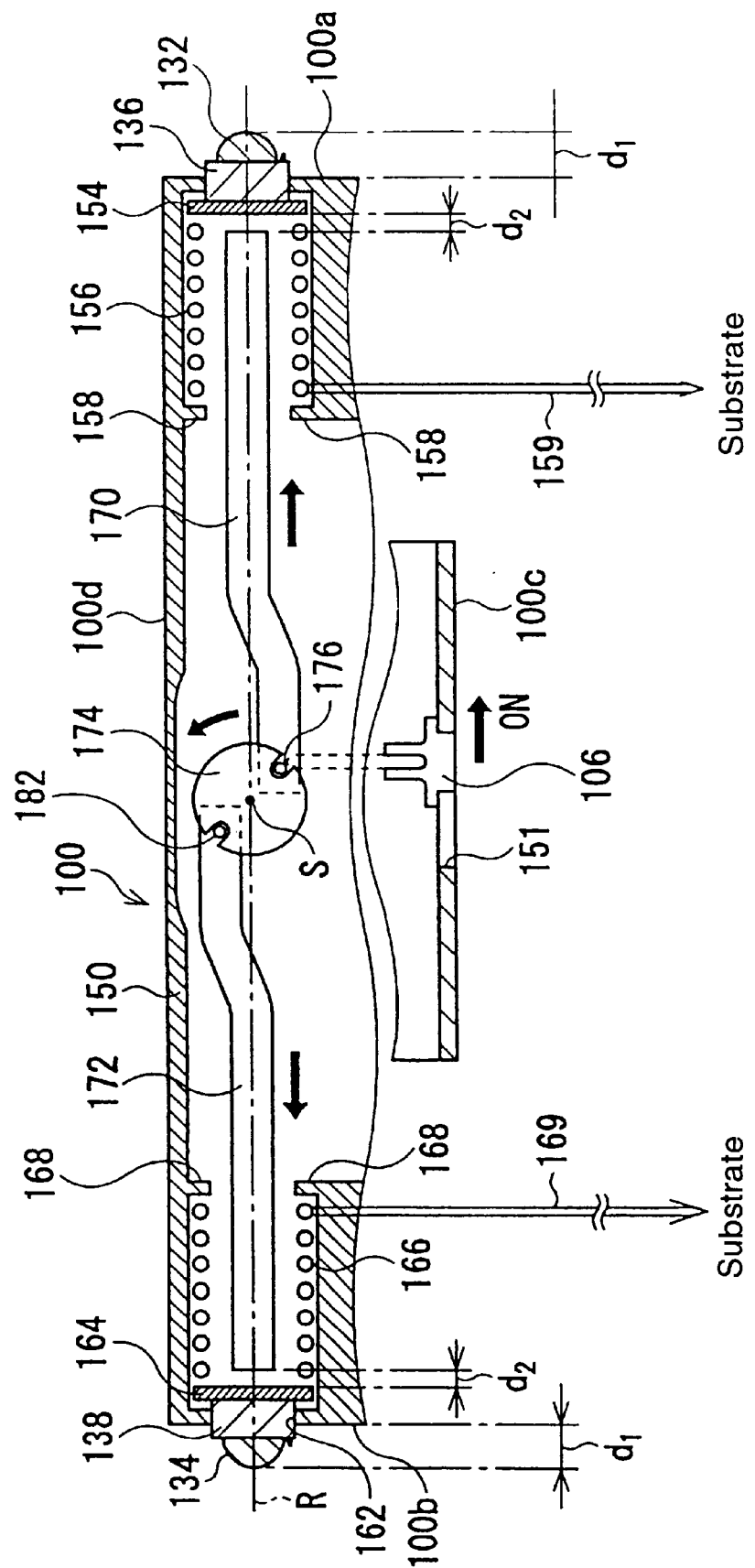

FIGS. 9 and 10 show sectional views of the monitor device 100 taken along a plane including the axis R when the power switch 106 is OFF and ON, respectively.

In FIGS. 9 and 10, the monitor device 100 is symmetrical and the following explanation will be directed only to the elements in the right half in the drawings. Elements in the left half, corresponding to those in the right half are designated with similar reference numerals having 10 added thereto (e.g., 156 and 166, 159 and 169, etc.).

The monitor device 100 is provided with a housing 150 made of an insulating material, such as synthetic resin, which is provided on its side surface 100a with the opening 152. The first monitor engagement portion 132 and the shaft portion 136 project through the opening 152 and are moved together in the direction of the axis R. The projection length thereof from the opening 152 is represented by the distance d1 from the first monitor side surface 100a to the front end of the first monitor engagement portion 132.

The housing 150 is provided on its inner end surface with a slip-off prevention plate 154 secured thereto and is pressed by a compression spring (resilient member) 156 at the surface of the slip-off prevention plate 154 on the side opposite the shaft portion 136. The first monitor engagement portion 132 and the shaft portion 136 are continuously biased by the spring 156 through the slip-off prevention 154 in the direction to project from the opening 152 by the length d1. The housing 150 is provided on its inner wall with a spring seat 158 which receives the spring 156.

The first monitor engagement portion 132, the shaft portion 136, the slip-off prevention plate 154 and the spring 156 are made of a conductor such as a metal. The spring 156 is connected to a switching circuit (not shown) provided on a substrate of the monitor device 100 (not shown) through a lead 159. The switching circuit is associated with the ON/OFF state of the power switch 106 to judge an absence or presence of the power supply to the monitor device 100 from the camera body 10.

For instance, when the monitor device 100 is attached to the recess 14 of the camera body 10 in the front position, the surface of the first monitor engagement portion 132 abuts against the first recess side surface 14a of the recess, so that the first monitor engagement portion 132 is pressed toward the center S. In this state, the first monitor engagement portion 132 is moved toward the center S together with the shaft portion 136 and the slip-off prevention plate 154 against the spring force of the spring 156.

When the monitor device 100 is inserted in the recess 14 and the first monitor engagement portion 132 is moved to engage with the first body engagement portion 32, the first monitor engagement portion 132, the shaft portion 136, and the slip-off prevention plate 154 are moved in the direction to project from the opening 152 by the spring force of the spring 156. Consequently, the first monitor engagement portion 132 enters the first body engagement portion 32. Thus, the monitor device 100 is rotatably attached to and electrically connected to the camera body 10. Note that power is not supplied by merely attaching the monitor device 100 to the camera body 10; i.e., power is not supplied until the switching circuit is turned ON.

The monitor device 100 can be easily attached to or detached from the camera body 10 in any direction within the angular displacement range due to the movement of the first and second hemispherical monitor engagement portions 132 and 134 in the direction of the axis R. Since the first and second monitor engagement portions 132 and 134 not only serve to rotatably and detachably connect the monitor device 100 but also serve as electrical contacts, it is not necessary to separately provide a rotation connection device and contacts therefor as in the prior art, and hence the number of the components can be reduced. Therefore, not only can the electronic still camera be simplified but also the manufacturing cost can be reduced.

The slip-off prevention device which includes first and second shaft members 170 and 172 and a rotary plate 174 connected thereto will be explained below. The rotary plate 174 is supported in the housing 150 to rotate about an axis passing through the center S. The first shaft member 170 extends from the vicinity of the center S toward the opening 152 in the axial direction R of the housing 150. The first shaft member 170 is provided on its end adjacent to the center S with a pin 176 which is engaged with a cut-away portion 178 formed in the rotary plate 174 at the outer periphery thereof, to connect the first shaft member 170 to the rotary plate 174.

The second shaft member 172 is symmetrical to the first shaft member 170 with respect to the center S. The second shaft member 172 is provided on its end adjacent to the center S with a pin 180 which is engaged in a cut-away portion 182 formed in the rotary plate 174 and opposed to the cut-away portion 178, to connect the second shaft member 172 to the rotary plate 174.

The pin 176 of the first shaft member 170 is connected to the power switch 106 by means of a connector (not shown). The power switch 106 is movable in an opening 151 formed in the surface 100c parallel to the axis R. Namely, the power switch is moved to the left end of the opening 151 to turn the power source of the monitor device 100 OFF (FIG. 9) and is moved to the right end of the opening 151 to turn the power source ON (FIG. 10).

The first shaft member 170 is moved along the axis R in the same direction as the movement of the power switch 106, so that the distance thereof from the slip-off prevention plate 154 is varied. Specifically, when the power source is OFF (FIG. 9), the distance d2 from the end 170a, of the first shaft member 170 which is adjacent to the opening 152, to the slip-off prevention plate 154, is larger than the length of projection d1 of the first monitor engagement portion 132; so that the front end of the first monitor engagement portion 132 can be moved toward the center S beyond the first monitor side surface 100a. Conversely, when the power source is ON (FIG. 10), the distance d2 is smaller than the projection length d1, so that the front end of the first monitor engagement portion 132 cannot be moved closer to the center S than the first monitor side surface 100a.

When the power switch 106 is moved in the right direction from the OFF position to the ON position, the first shaft member 170 is moved toward the opening 152, as indicated by a black arrow in FIG. 10, and the rotary plate 174 is rotated in the counterclockwise direction in association with the movement of the first shaft member 170. The rotation of the rotary plate 174 causes the second shaft member 172 to move along the axis R toward the left opening 164.

When the power switch 106 is moved from the ON position to the OFF position, the first shaft member 170 is moved toward the center S, as indicated by a white arrow in FIG. 9, and the rotary plate 174 is rotated in the clockwise direction in association with the movement of the first shaft member 170. The rotation of the rotary plate 174 causes the second shaft member 172 to move toward the center S.

As can be understood from the foregoing, with the arrangement in which the first and second shaft members 170, 172 and the rotary plate 174 are associated with each other and are moved in accordance with the operation of the power switch 106, when the power source is ON while the monitor device 100 is attached to the camera body 10, the relative movement of the first and second monitor engagement portions 132 and 134 along the axis R is restricted. Thus, no accidental disengagement of the first and second monitor engagement portions 132 ad 134 from the corresponding first and second body engagement portions 32 and 34 takes place, so that detachment of the monitor device 100 from the camera body 10 can be prevented.

The electrical arrangement and operation of the electronic still camera will be discussed below with reference to FIG. 11.

The camera body 10 includes a body CPU (control device) 61 which generally controls the operation of the electronic still camera based on command signals supplied from the main switch 18, the release switch 20, or the operation switches 104 of the monitor device 100.

The lens unit 12 of the camera body 10 is comprised of a photographic optical system 60 and a shutter mechanism 62, which are both driven by a motor driver 64. The shutter mechanism 62 is provided with a diaphragm, and a filter portion etc., and performs the exposure operation. The lens unit 12 is also provided with an automatic focusing mechanism.

The object image obtained through the lens unit 12 is fed to the image pickup surface of the CCD 66 and is converted to an electric signal (analogue signal) in accordance with the control of a CCD drive circuit 68. The analogue signal is amplified by an amplifier (AMP) 70 and is converted to a digital signal by an A/D converter 72 and is sent to an image processing circuit (DSP) 74 as a digital image signal. The digital image signals is subject to predetermined image processing, such as shading correction, etc., in the DSP 74, based on the command signals of the body CPU 61. The processed signals are temporarily stored in an image memory 78 through a memory controller 76.

The digital image signals stored in the memory 78 are read therefrom by the DSP 74 and are converted to monitoring image signals corresponding to the monitor device 100. For example, if the monitor device 100 is in the form of an LCD, the R, G and B color signals contained in the digital image signals are converted to analogue brightness signals and color difference signals, which are thereafter subject to color correction or the like.

The monitoring image signals are output from the DSP 74 to the body communication circuit (body communication device) 80, where the signals are modulated and are transmitted to the monitor device 100 through the communication window 22. When the modulated monitoring image signals are received by the monitoring communication window 108 of the monitor device 100, the signals are demodulated by the monitor communication circuit (monitor communication device) 202 and are input to the monitor drive circuit 206. Consequently, the image corresponding to the object image is obtained from the monitoring image signals and is indicated in the image indication portion 102 in accordance with the control of the monitor drive circuit 206.

If the main switch 18 and the power switch 106 are turned ON, the series of operations mentioned above are repeated and thus, object images which move in accordance with the movement of the operator are indicated as a motion picture in the image indication portion 102.

If the release switch (button) 20 is depressed by half step, the object image in the image indication portion 102 at the half-step depression forms a still image which is recorded when the release button 20 is thereafter depressed by full step. Namely, when the full depression of the release switch 20 is detected by the body CPU 61, the digital image signals corresponding to the still image is read from the image memory 78; is compressed in the DSP 74; and is recorded in the internal memory 82 by the memory controller 76, or is converted into a predetermined format by the card interface 84 and is selectively recorded in a recording medium, such as a PC card 86, etc.

If a reproduction mode is selected to reproduce the image by the operation of the operation switches 104, the reproduction instruction signal is transmitted to the body CPU 61 via the monitor CPU 200, the monitor communication circuit 202, the monitor communication window 22, and the body communication circuit 80. In the DSP 74, the body CPU 61 expands the image signals stored in the internal memory 82 or the PC card 86, based on the instruction signal. The signals are thereafter transmitted to the monitor device 100. After the image signals are received by the monitor device 100, the monitor device 100 carries out the same operations as those upon photographing, and indicates the reproduced image in the image indication portion 102.

The camera body 10 is provided with a battery (body camera supply) 88, so that electricity is supplied to the body power source circuit 90 from the battery 88 and is supplied therefrom to each circuit of the camera body 10 through the body CPU 61. When the monitor device 100 is attached to the camera body 10, electricity is supplied from the first and second body engagement portions 32 and 34 which serve as the electrical contacts to the monitor CPU 200 through the first and second monitor engagement portions 132 and 134 and therefrom to each circuit of the monitor device 100.

The monitor device 100 is provided with a battery (monitor power supply) 208, so that when the monitor device 100 is detached from the camera body 10 or when the battery 88 of the camera body 10 has been consumed, electricity is supplied from the battery 208 to each circuit through the monitor power source circuit 210.

Figure 12:
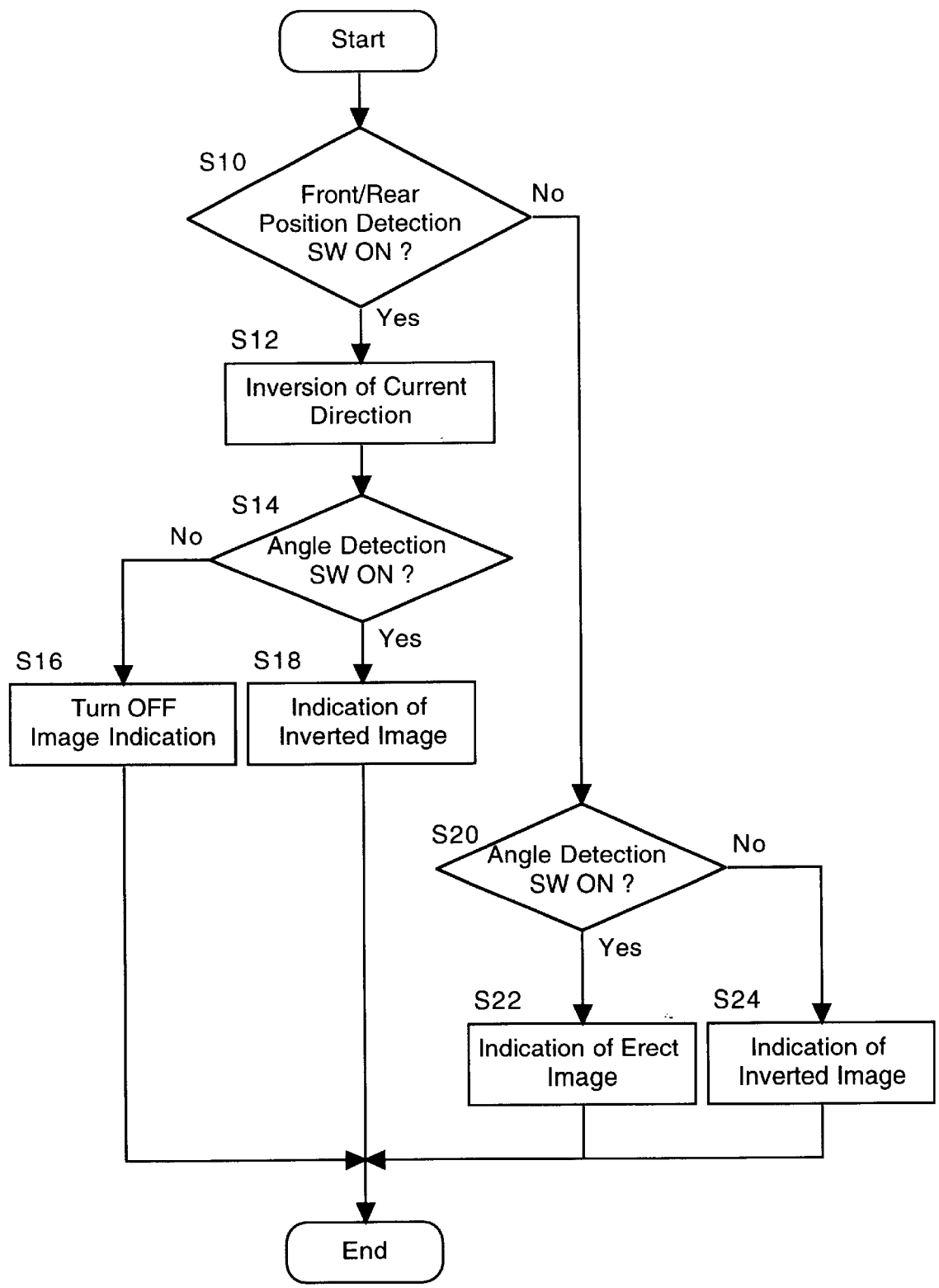
FIG. 12 is a flow chart of operations in a body CPU shown in FIG. 11.

FIG. 12 shows a flow chart of an operation routine to control the direction of the current in the body CPU 61 and the direction of the object image in the image indication portion 102.

When an ON state of the power sources of the camera body 10 and the monitor device 100 is detected, the operation routine begins at step S10. At step S10, whether or not the front/rear position detection switch 56 is turned ON is checked. If the front/rear position detection switch 56 is ON, the control proceeds to step S12 to invert the direction of the current (+ or −). At step S14, whether or not the angle detection switch 52 is turned ON is checked.

If the angle detection switch 52 is OFF at step S14, it is deemed that the image indication portion 102 is within the angular displacement range C, so that the image indication portion 102 is turned OFF at step S16 and no image is indicated.

If the angle detection switch 52 is ON at step S14, it is deemed that the image indication portion 102 is within the angular displacement range D, so that the operation at step S18 is carried out to indicate an inverted image in the image indication portion 102.

If the front/rear position detection switch 56 is OFF at step S10, no inversion of the current direction is carried out and the control proceeds to step S20 to check whether or not the angle detection switch 52 is ON.

If the angle detection switch 52 is ON at step S20, it is deemed that the image indication portion 102 is within the angular displacement range "A", so that an erect object image is indicated in the image indication portion 102 at step S22.

If the angle detection switch 52 is turned OFF at step S20, it is deemed that the image indication portion 102 is within the angular displacement range B, so that an inverted image is indicated in the image indication portion 102 at step S24.

After the operation at step S16, S18, S22 or S24 is carried out, the operation routine ends.

As described above, in an electronic still camera according to the present invention, the monitor device 100 having the image indication portion 102 is detachably and rotatably attached to the camera body 10, and the angular position of the image indication portion 102 relative to the camera body 10 is detected by the angle detection switch 52 and the front/rear position detection switch 56, so that the camera operation can be controlled by the body CPU 61 of the camera body 100 in accordance with the detection result. Consequently, not only can the freedom of the position of the image indication portion 102 relative to the object image be enhanced, but also the object image in the image indication portion 102 can be visually confirmed with ease.

Moreover, since the connection portions between the camera body 10 and the monitor device 100 (between the first and second body engagement portions 32, 34 and the first and second monitor engagement portions 132, 134) serve as a rotating mechanism as well as electrical contacts, not only can the number of the components of the electronic still camera and the size thereof be decreased, but also the manufacturing cost can be reduced.

As can be understood from the above discussion, according to the present invention, in an electronic still camera to which a monitor device can be detachably attached, the attachment and detachment of the monitor device can be facilitated and the number of the camera components can be reduced, thus resulting in reduction of the manufacturing cost and in a miniaturization of the camera.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. An electronic still camera comprising:
    a camera body having a photographic optical system;
    a monitor device detachably attached to the camera body, said monitor device comprising an image display portion in which an object image obtained by the photographic optical system is displayed;
    first and second body engagement portions provided in said camera body;
    first and second monitor engagement portions provided in said monitor device, said first and second monitor engagement portions being configured to rotatably engage with said first and second body engagement portions,
    wherein said monitor device is rotatable about a rotation axis provided in the camera body within a predetermined range of angular displacement; and
    wherein said monitor device can be detachably attached to said camera body in any orientation within said predetermined angular displacement range,
    wherein said camera body is provided with a receiving portion configured to receive said monitor device,
    wherein said first and second body engagement portions are opposed to each other, and lie on the rotation axis, and
    wherein said first and second monitor engagement portions are opposed to said first and second body engagement portions when said monitor device is received by the receiving portion of said camera body,
    wherein said monitor device comprises:
        a first resilient member that biases said first monitor engagement portion outwardly; and
        a second resilient member that biases said second monitor engagement portion outwardly,
        whereby said first and second monitor engagement portions securely engage with said first and second body engagement portions by a biasing force of said first and second resilient members.

2. The electronic still camera according to claim 1, wherein the rotation axis extends in a plane perpendicular to an optical axis of the photographic optical system.

3. The electronic still camera according to claim 2, wherein said camera body comprises a substantially parallelepiped body, the photographic optical system being configured so that the optical axis thereof extends in a direction perpendicular to a first surface of said camera body;
    wherein the receiving portion comprises a substantially parallelepiped recess which is open at a second surface of said camera body opposite to said first surface and is open at a third surface of the camera body perpendicular to said first and second surfaces, said monitor device being substantially identical in shape and size to the parallelepiped recess, so that said monitor device are received into said parallelepiped recess.

4. The electronic still camera according to claim 3,
    wherein said first and second body engagement portions are substantially identical in shape and size, are provided on opposing first and second recess surfaces of the parallelepiped recess, and
    said first and second monitor engagement portions are substantially identical in shape and size and are provided on first and second surfaces of said monitor device which are respectively opposed to said first and second recess surfaces of said parallelepiped recess when said monitor device is received into the parallelepiped recess of said camera body.

5. The electronic still camera according to claim 4, wherein each of said first and second body engagement portions comprises a hemispherical recess;
  each of said first and second monitor engagement portions comprises a hemispherical projection; and
  said first and second monitor engagement portions are movable in a direction along the rotation axis relative to the corresponding first and second monitor surfaces.

6. The electronic still camera according to claim 1, wherein said monitor device is configured to be detachably attached to said camera body, wherein said image display portion is configured to be positioned facing at least one of forward or backward with respect to said camera body.

7. The electronic still camera according to claim 6, further comprising:
  a front/rear position detection device that detects whether said image display portion is positioned facing forward or backward with respect to said camera body;
  an angle detection device that detects an angle of said image display portion about the rotation axis relative to the optical axis of the photographic optical system; and
  a control device that controls an orientation of the object image displayed in said image display portion, in accordance with the detection results of said front/rear position detection device and said angle detection device.

8. The electronic still camera according to claim 7, wherein said camera body comprises a body power supply;
  wherein when said monitor device is attached to said camera body, said body power supply of said camera body supplies power to said monitor device.

9. The electronic still camera according to claim 8, wherein said control device controls a direction of electric current which flows in said monitor device in accordance with the detection results of said front/rear position detection device and said angle detection device.

10. The electric still camera according to claim 7, wherein said front/rear position detection device comprises an outer peripheral groove provided in a vicinity of one of said first and second monitor engagement portions of said monitor device, and a front/rear position detection switch provided on said camera body, said front/rear position detection switch having a front/rear position detection pin which projects from said camera body so that said front/rear position detection switch is turned ON or OFF in accordance with a projected length of said front/rear position detection pin;
  wherein said front/rear position detection device detects whether said image display portion is positioned facing forward or backward with respect to the camera body in accordance with whether said front/rear position detection pin is received into said outer peripheral groove.

11. The electronic still camera according to claim 7, wherein said angle detection device comprises:
  first and second annular grooves provided around said first and second body engagement portions;
  first and second annular projections that are provided around said first and second monitor engagement portions and are respectively engageable with said first and second annular grooves; and
  an angle detection switch, provided in said camera body, comprising an angle detection pin which projects into one of said first and second annular grooves, so that an angular position of said image display portion is detected in accordance with depression of said angle detection pin of said angle detection switch by one of said first annular projection and said second annular projection.

12. An electronic still camera comprising:
  a camera body having a photographic optical system;
  a monitor device detachably attached to said camera body, said monitor device comprising an image display portion in which an object image obtained by the photographic optical system is displayed;
  at least one engagement portion provided on at least one of said camera body and said monitor device so that said monitor device is detachably attached to said camera body; and
  at least one resilient member provided on at least one of said camera body and said monitor device, said at least one resilient member biasing said at least one engagement portion,
  wherein said monitor device is rotatable about a rotation axis provided on said camera body within a predetermined range of angular displacement,
  wherein said monitor device is detachably attached to said camera body in any orientation within the predetermined angular displacement range.

13. The electronic still camera according to claim 12, wherein said monitor device comprises a power switch which is actuated to turn a power source of said monitor device ON or OFF, and a slip-off prevention device that prevents said monitor device attached to said camera body from being disengaged from said camera body when the power source is turned ON.

14. The electronic still camera according to claim 13, wherein said slip-off prevention device comprises:
  first and second shaft members which are moved along the rotation axis in association with the movement of the power switch between an ON position and an OFF position, and a rotary plate which connects the first and second shaft members;
  said first and second shaft members being moved to restrict the movement of said first and second monitor engagement portions when the power switch is moved to the ON position.

15. The electronic still camera according to claim 13, said camera body further comprising:
  an image pickup device that converts an object image obtained through said photographic optical system into an electrical signal;
  wherein said monitor device displays the object image converted by said image pickup device on said image display portion.

16. The electronic still camera according to claim 15, wherein an electric signal including at least one signal corresponding to the object image is transmitted and received between the camera body and the monitor device via a radio communication system.

17. The electronic still camera according to claim 13, said camera body further comprising:
  an image memory which stores an electrical signal of an object image produced by an image pickup device;
  wherein said monitor device displays the object image, which is stored in said image memory, on said image display portion.

18. An electronic still camera comprising:
  a camera body having a photographic optical system;
  a monitor device detachably attached to the camera body, said monitor device comprising an image display portion in which an object image obtained by the photographic optical system is displayed;

first and second body engagement portions provided in said camera body; and first and second monitor engagement portions provided in said monitor device, which are configured to be rotatably engaged with said first and second body engagement portions, wherein said monitor device is rotatable about a rotation axis provided in the camera body within a predetermined range of angular displacement;

wherein said monitor device can be detachably attached to the camera body in any orientation within said predetermined angular displacement range, wherein the rotation axis extends in a plane perpendicular to an optical axis of the photographic optical system, wherein said camera body comprises a substantially parallelepiped body, said photographic optical system is configured so that the optical axis of said photographic optical system extends in a direction perpendicular to a first surface of the camera body, wherein said camera body is provided with a substantially parallelepiped recess which is open at a second surface of the camera body opposite to said first surface and is open at a third surface of the camera body perpendicular to said first and second surfaces, said monitor device having a shape and size such that said monitor device can be received into said parallelepiped recess, wherein said first and second body engagement portions are provided on opposing first and second recess surfaces of said parallelepiped recess, are opposed to each other, and lie on the rotational axis, wherein said first and second monitor engagement portions are provided on first and second surfaces of said monitor device which are opposed to said first and second recess surfaces of said parallelepiped recess when the monitor device is received into said parallelepiped recess of the camera body, wherein each of said first and second body engagement portions comprises a hemispherical recess, wherein each of said first and second monitor engagement portions comprises a hemispherical projection, wherein said first and second monitor engagement portions are movable in a direction along the rotation axis relative to the corresponding first and second monitor surfaces, wherein said monitor device comprises:
  a first resilient member which biases said first monitor engagement portion toward said first monitor surface; and
  a second resilient member which biases said second monitor engagement portion toward said second monitor surface,
  whereby the first and second monitor engagement portions can be securely engaged by the first and second body engagement portions by the biasing force of the first and second resilient members.

19. An electronic still camera comprising:

a camera body having a photographic optical system;

a monitor device detachably attached to the camera body, said monitor device comprising an image display portion in which an object image obtained by the photographic optical system is displayed;

wherein said monitor device is rotatable about a rotation axis provided in said camera body within a predetermined range of angular displacement, wherein said monitor device can be detachably attached to said camera body in any orientation within said predetermined angular displacement range, and wherein said monitor device comprises:
  a power switch that turns a power source of said monitor device ON or OFF; and
  a slip-off preventer that prevents said monitor device attached to said camera body from being disengaged from said camera body when the power source is turned ON.

20. The electronic still camera according to claim 19, wherein said monitor device comprises:

first and second monitor engagement portions configured to engage with said camera body;

a first resilient member that biases said first monitor engagement portion outwardly; and a second resilient member that biases said second monitor engagement portion outwardly;

whereby said first and second monitor engagement portions securely engage said camera body by a biasing force of said first and second resilient members.

* * * * *